(12) United States Patent
Murray

(10) Patent No.: US 8,108,680 B2
(45) Date of Patent: Jan. 31, 2012

(54) PREVENTING UNAUTHORIZED POACHING OF SET TOP BOX ASSETS

(76) Inventor: Mark R. Murray, Atlanta, GA (US)

( * ) Notice: Subject to any disclaimer, the term of this patent is extended or adjusted under 35 U.S.C. 154(b) by 766 days.

(21) Appl. No.: 11/781,412

(22) Filed: Jul. 23, 2007

(65) Prior Publication Data
US 2009/0031409 A1  Jan. 29, 2009

(51) Int. Cl.
H04L 9/32 (2006.01)
(52) U.S. Cl. .................................. 713/176; 707/104
(58) Field of Classification Search .................. 725/100, 725/110, 131, 139, 151; 713/176
See application file for complete search history.

(56) References Cited

U.S. PATENT DOCUMENTS

| | | | |
|---|---|---|---|
| 5,224,161 A | 6/1993 | Daniel et al. | |
| 5,349,641 A | 9/1994 | Coutrot et al. | |
| 5,742,677 A | 4/1998 | Pinder | |
| 5,870,474 A | 2/1999 | Wasilewski | |
| 5,933,503 A | 8/1999 | Schell et al. | |
| 6,005,938 A | 12/1999 | Banker | |
| 6,012,068 A * | 1/2000 | Boezeman et al. | 1/1 |
| 6,020,982 A | 2/2000 | Yamauchi et al. | |
| 6,105,134 A | 8/2000 | Pinder | |
| 6,148,082 A | 11/2000 | Slattery et al. | |
| 6,157,719 A | 12/2000 | Wasilewski et al. | |
| 6,173,400 B1 | 1/2001 | Perlman et al. | |
| 6,230,269 B1 | 5/2001 | Spies et al. | |
| 6,246,767 B1 | 6/2001 | Akins | |
| 6,252,964 B1 | 6/2001 | Wasilewski | |
| 6,292,568 B1 | 9/2001 | Akins | |
| 6,345,307 B1 | 2/2002 | Booth | |
| 6,356,971 B1 | 3/2002 | Katz et al. | |
| 6,424,714 B1 | 7/2002 | Wasilewski | |
| 6,424,717 B1 | 7/2002 | Pinder | |
| 6,510,519 B2 | 1/2003 | Wasilewski | |
| 6,516,412 B2 | 2/2003 | Wasilewski | |
| 6,526,508 B2 | 2/2003 | Akins | |

(Continued)

FOREIGN PATENT DOCUMENTS

EP  0 782 296  7/1997

(Continued)

OTHER PUBLICATIONS

U.S. Appl. No. 09/111,958, filed Jul. 8, 1998, entitled "Mechanism and Apparatus for Encapsulation of Entitlement Authorization in Conditional Access System," Inventor: Defreese.

(Continued)

*Primary Examiner* — Kambiz Zand
*Assistant Examiner* — Dant Shaifer Harriman
(74) *Attorney, Agent, or Firm* — Merchant & Gould

(57) ABSTRACT

To prevent poaching of an Internet Protocol (IP) set top box (STB) asset or similar network computing device from one system operator to another, code executing in the IP STB not only authenticates downloaded software images using a public key provided in a serial-number assigned digital certificate, but also confirms that the serial number appears on a signed whitelist, or does not appear on a signed blacklist. The code executing in the STB further preferably enforces a rule that only the authority that signed the already-loaded whitelist/blacklist may replace it with a new list. Such a "sticky whitelist/blacklist" ensures that if the STB boots or resets in a new network, the existing authentication list will not be replaced by a list that is valid for a new or different network, and, as a result, that new software code images will not be authenticated.

23 Claims, 7 Drawing Sheets

U.S. PATENT DOCUMENTS

| | | | |
|---|---|---|---|
| 6,560,340 B1 | 5/2003 | Akins | |
| 6,574,609 B1 | 6/2003 | Downs et al. | |
| 6,727,944 B1 | 4/2004 | Adachi | |
| 6,744,892 B2 | 6/2004 | Akins | |
| 6,748,080 B2 | 6/2004 | Russ et al. | |
| 6,804,357 B1 | 10/2004 | Ikonen et al. | |
| 6,937,729 B2 | 8/2005 | Akins | |
| 6,970,564 B1 | 11/2005 | Kubota et al. | |
| 6,971,008 B2 | 11/2005 | Wasilewski | |
| 7,062,658 B1 | 6/2006 | Cheriton et al. | |
| 7,065,216 B1 | 6/2006 | Benaloh et al. | |
| 7,124,303 B2 | 10/2006 | Candelore et al. | |
| 7,127,619 B2 | 10/2006 | Unger et al. | |
| 7,151,831 B2* | 12/2006 | Candelore et al. | 380/200 |
| 7,155,609 B2 | 12/2006 | Chan et al. | |
| 7,181,010 B2 | 2/2007 | Russ et al. | |
| 7,200,868 B2 | 4/2007 | Mattox et al. | |
| 7,287,168 B2 | 10/2007 | Candelore et al. | |
| 7,505,592 B2 | 3/2009 | Russ et al. | |
| 7,515,712 B2 | 4/2009 | Wasilewski et al. | |
| 7,636,846 B1* | 12/2009 | Eskicioglu | 713/176 |
| 7,949,133 B2 | 5/2011 | Pinder | |
| 2001/0006400 A1 | 7/2001 | Kubo et al. | |
| 2002/0013772 A1 | 1/2002 | Peinado | |
| 2002/0018130 A1 | 2/2002 | Suemoto et al. | |
| 2002/0026582 A1 | 2/2002 | Futamura et al. | |
| 2002/0099663 A1 | 7/2002 | Yoshino et al. | |
| 2002/0101990 A1 | 8/2002 | Morino et al. | |
| 2002/0108122 A1* | 8/2002 | Alao et al. | 725/117 |
| 2002/0146237 A1 | 10/2002 | Safadi | |
| 2002/0196939 A1* | 12/2002 | Unger et al. | 380/216 |
| 2003/0009668 A1 | 1/2003 | Chan | |
| 2003/0021412 A1 | 1/2003 | Candelore et al. | |
| 2003/0026423 A1 | 2/2003 | Unger et al. | |
| 2003/0035543 A1 | 2/2003 | Gillon et al. | |
| 2003/0046686 A1 | 3/2003 | Candelore et al. | |
| 2003/0081776 A1* | 5/2003 | Candelore | 380/200 |
| 2003/0093680 A1 | 5/2003 | Astley et al. | |
| 2003/0145329 A1 | 7/2003 | Candelore et al. | |
| 2003/0159140 A1 | 8/2003 | Candelore et al. | |
| 2003/0174837 A1 | 9/2003 | Candelore et al. | |
| 2003/0182579 A1 | 9/2003 | Leporini et al. | |
| 2003/0188164 A1 | 10/2003 | Okimoto et al. | |
| 2003/0233558 A1* | 12/2003 | Lieberman et al. | 713/189 |
| 2004/0022307 A1 | 2/2004 | Dale et al. | |
| 2004/0052377 A1 | 3/2004 | Mattox et al. | |
| 2004/0073917 A1 | 4/2004 | Pedlow et al. | |
| 2004/0098591 A1 | 5/2004 | Fahrny | |
| 2004/0098603 A1 | 5/2004 | Corinne | |
| 2004/0123094 A1 | 6/2004 | Sprunk | |
| 2004/0128499 A1 | 7/2004 | Peterka et al. | |
| 2004/0187014 A1 | 9/2004 | Molaro | |
| 2004/0228175 A1 | 11/2004 | Candelore et al. | |
| 2005/0080497 A1 | 4/2005 | Rao | |
| 2005/0091173 A1 | 4/2005 | Alve | |
| 2005/0100162 A1 | 5/2005 | Alve et al. | |
| 2005/0102513 A1 | 5/2005 | Alve | |
| 2005/0102702 A1 | 5/2005 | Candelore et al. | |
| 2005/0105732 A1 | 5/2005 | Hutchings et al. | |
| 2005/0169473 A1 | 8/2005 | Candelore et al. | |
| 2005/0180568 A1 | 8/2005 | Krause | |
| 2005/0192904 A1 | 9/2005 | Candelore et al. | |
| 2005/0201559 A1 | 9/2005 | Van Der Heijden | |
| 2005/0237396 A1 | 10/2005 | Hagiwara et al. | |
| 2005/0240974 A1 | 10/2005 | Hiramoto et al. | |
| 2006/0020786 A1 | 1/2006 | Helms et al. | |
| 2006/0039256 A1 | 2/2006 | Nakamura et al. | |
| 2006/0041905 A1 | 2/2006 | Wasilewski | |
| 2006/0072752 A1 | 4/2006 | Nakano et al. | |
| 2006/0074807 A1 | 4/2006 | Gauba et al. | |
| 2006/0115083 A1 | 6/2006 | Candelore et al. | |
| 2006/0153379 A1 | 7/2006 | Candelore et al. | |
| 2006/0179478 A1 | 8/2006 | Han et al. | |
| 2006/0187951 A1 | 8/2006 | Ginzburg et al. | |
| 2006/0200865 A1 | 9/2006 | Leake et al. | |
| 2006/0262926 A1 | 11/2006 | Candelore et al. | |
| 2006/0269060 A1 | 11/2006 | Candelore et al. | |
| 2007/0099694 A1* | 5/2007 | McCarthy et al. | 463/24 |
| 2007/0150960 A1 | 6/2007 | Dubroeucq et al. | |
| 2007/0189525 A1 | 8/2007 | Wajs | |
| 2007/0192586 A1 | 8/2007 | McNeely | |
| 2007/0204146 A1 | 8/2007 | Pedlow et al. | |
| 2007/0291940 A1 | 12/2007 | Candelore et al. | |
| 2007/0294170 A1 | 12/2007 | Vantalon et al. | |
| 2007/0294178 A1 | 12/2007 | Pinder et al. | |
| 2008/0005030 A1 | 1/2008 | Schlarb et al. | |
| 2008/0137852 A1 | 6/2008 | Mamidwar | |
| 2008/0170687 A1 | 7/2008 | Moors et al. | |
| 2008/0177998 A1* | 7/2008 | Apsangi et al. | 713/155 |
| 2009/0028327 A1 | 1/2009 | Pinder | |
| 2009/0031409 A1 | 1/2009 | Murray | |
| 2009/0080648 A1 | 3/2009 | Pinder | |

FOREIGN PATENT DOCUMENTS

| | | |
|---|---|---|
| EP | 1 014 715 | 6/2000 |
| EP | 1 447 983 A1 | 8/2004 |
| EP | 2 403 586 A | 1/2005 |
| EP | 1760619 A | 3/2007 |
| WO | 0050978 A | 8/2000 |
| WO | WO 00/51041 | 8/2000 |
| WO | WO 01/82588 | 11/2001 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | WO 2009/015116 A1 | 1/2009 |
| WO | WO 2009/018006 | 2/2009 |
| WO | WO 2009/042532 | 4/2009 |

OTHER PUBLICATIONS

U.S. Appl. No. 10/789,337, fled Feb. 27, 2004, "Secure Negotiation and Encryption Module," Inventor: Sedacca.

U.S. Appl. No. 11/464,421, filed Jun. 16, 2006, entitled "Securing Media Content Using Interchangeable Encryption Key," Inventor: Pinder.

U.S. Appl. No. 10/981,347, filed Mar. 25, 2003, entitled "Mechanism and Apparatus for Encapsulation of Entitlement Authorization in a Conditional Access System," Inventor: Defreese.

U.S. Appl. No. 11/428,367, filed Jun. 30, 2006, entitled "Secure Escrow and Recovery of Media Device Content Keys," Inventor: Schlarb.

U.S. Appl. No. 11/861,328, filed Sep. 28, 2007, entitled "Controlled Cryptoperiod Timing to Reduce Decoder Processing Load, " Inventor: Pinder.

U.S. Appl. No. 11/671,506, filed Feb. 6, 2007, entitled "Apparatus for Entitling and Transmitting Service Instances to Remote Client Devices," Inventor: Russ.

U.S. Appl. No. 11/829,674, filed Jul. 27, 2007, entitled "Secure Content Key Distribution Using Multiple Distinct Methods," Inventor: Pinder.

International Search Report for PCT/US2008/070707, Sep. 16, 2008.

"Explorer 8300 Series Digital Recorder" ScientificAtlanta.com [online] Oct. 2005, XP002459851, Retrieved from Internet: URL:http://www.cisco.com/application/pdf/en/us/guest/products/ps8613/c1650/cdc_cont_0900aecd806c6913.pdf [retrieved Nov. 22, 2007].

Gilo: "Do It Yourself Making an External Hard Drive Guide" Notebookreview.com [online], Jun. 2, 2006, XP002459852, Retrieved from Internet: URL:http://www.notebookreview.com/default.asp?newsID=2972 [retrieved on Nov. 22, 2007].

International Search Report dated Jan. 31, 2008 in PCT/US2007/070680.

International Search Report and Written Opinion mailed Sep. 16, 2008 in PCT/US2008/070707.

International Search Report dated Dec. 12, 2008 in PCT/US2008/070690.

Written Opinion dated Dec. 12, 2008 in PCT/US2008/070690.

International Preliminary Report mailed Jan. 6, 2009 in PCT/US2007/072328.

International Search Report dated Apr. 28, 2009 in PCT/US2008/077157.

European Office Action mailed May 7, 2009 in Application No. 07 840 308.6.
European Office Action mailed Jun. 9, 2009 in Application No. 07 815 092.7.
International Preliminary Report on Patentability dated Mar. 30, 2010 in PCT/US2008/077157.
EP Communication dated May 6, 2010 in Application No. 08 833 391.9-1244.
European Office Action mailed Sep. 9, 2010 in Application No. 07 840 308.6.
Office Action mailed Sep. 22, 2009, in U.S. Appl. No. 11/454,421.
Office Action mailed Oct. 7, 2009, in U.S. Appl. No. 11/428,367.
Office Action mailed Apr. 13, 2010, in U.S. Appl. No. 11/454,421.
Office Action mailed Apr. 14, 2010, in U.S. Appl. No. 11/428,367.
U.S. Official Action mailed Jun. 17, 2010 in U.S. Appl. No. 11/781,412.
U.S. Official Action mailed Aug. 16, 2010 in U.S. Appl. No. 11/829,647.
U.S. Official Action mailed Aug. 31, 2010 in U.S. Appl. No. 11/861,328.
Korean Notice of Rejection dated Oct. 25, 2010 in Application No. 10-2008-7030549.
U.S. Official Action mailed Feb. 2, 2011 in U.S. Appl. No. 11/829,647.
EP Summons to Attend Oral Proceedings dated Apr. 4, 2011 in Application No.
European Decision to Refuse dated Jul. 26, 2011 cited in Application No. 07 815 092.7-1245.
Korean Notice of Final Rejection dated Jul. 28, 2011 cited in Application No. 10-2008-7030549.
Canadian Office Action dated Aug. 24, 2011 cited in Application No. 2,655,114.
Canadian Office Action dated Aug. 29, 2011 cited in Application No. 2,655,530.

* cited by examiner

US 8,108,680 B2

PREVENTING UNAUTHORIZED POACHING OF SET TOP BOX ASSETS

TECHNICAL FIELD

The present disclosure relates generally to methods for providing enhanced control over set top boxes.

BACKGROUND

System operators, such a cable television service providers or content providers, generally, often provide set top boxes (STBs) to customers. STBs are generally connected between an incoming physical cable, wire, or other broadband connection and a nearby television set (or computer). As is well-known, STBs are conventionally used to, for example, demodulate and unscramble (as necessary) signals for standard television, pay per view, video on demand, gaming data, and other content that is broadcast from a head end of the system operator. The incoming data may be encoded in accordance with, for example, the Internet Protocol (IP) and be compliant with emerging IP television ("IPTV") systems.

System operators invest significantly in purchasing STBs, and then installing the STBs on customer premises. While a system operator may, over time, recoup the cost of the STBs through subscription fees, it may be months or even years before the cost associated with a given STB and its installation is fully recaptured. It is therefore particularly frustrating for an incumbent system operator when a competing system operator is not only able to convince a given customer to switch service to the competing system operator, but is also able to use (or "poach") the incumbent system operator's STB that is already in place on the customer premises. To the extent the incumbent system operator has not already recaptured the cost of the STB, that cost may be forever lost.

It is therefore desirable to provide a methodology or technique to better control STB assets belonging to an incumbent system operator.

SUMMARY

Embodiments of the present invention reduce or eliminate the possibility that a competing system operator that uses Internet Protocol set top boxes supplied from the same hardware vendor can poach the incumbent system operator's IP STBs into the competing system operator's network.

In accordance with embodiments of the invention, an IP STB preferably includes a code authentication mechanism that is built into an operating system-like program, referred to herein as "Bootloader code" or "the Bootloader." One function of the Bootloader is to ensure that any code executed on the STB is authenticated by a hardware vendor authorized signing key. The Bootloader recognizes a downloadable "whitelist" or "blacklist" that lists serial numbers associated with keys that are permitted (white) or not permitted (black) to be authenticated on the STB. The authentication list may be signed and authenticated by the hardware vendor's authorized signing key.

As noted, it is possible that an STB may be poached (i.e., transferred without functional impairment) from one system to another. For this to occur, the Bootloader may download a new version of software (properly authorized by the hardware vendor signing keys) and thus allow the transition from one operator network to another. Even if an authentication list is used, a new authentication list could be downloaded and enforced by the STB when it is powered on or is reset in the new network.

To reduce the possibility of poaching, the Bootloader in the STB preferably enforces a rule that only the authority that signed the current whitelist may replace it with a new whitelist. Such a "sticky whitelist" ensures that if the STB boots or resets in a new network, the existing authentication list will not be replaced by the list valid for the new network, and will not, accordingly, authenticate any code images from that network. This technique assumes that system operators require that their software providers use different signing keys for actual code images.

In an embodiment, a special hardware vendor-signed message can be used to remove an existing list to facilitate an authorized transition of STB asset from one system operator to another in the event of key loss, asset purchase, corporate merger, or other authorized instance.

These and other features of the several embodiments of the invention along with their attendant advantages will be more fully appreciated upon a reading of the following detailed description in conjunction with the associated drawings.

DESCRIPTION OF EXAMPLE EMBODIMENTS

An Internet Protocol (IP) set top box (STB) ("IP STB" or, more simply "STB") typically includes basic operating code that is embedded within, e.g., a ROM of an integrated circuit or chip and that is operable to load other, executable, software code into RAM, such as a flash memory. In the case of an IP STB, an operating system-like routine is typically initially loaded on the STB and operates to load and execute still other software code. The operating system-like code of the IP STB is referred to herein as "Bootloader code," or, more simply, "the Bootloader." STBs that include such Bootloader code are designed and sold by, e.g., Scientific-Atlanta (Lawrenceville, Ga.). These STBs are installed, e.g., by cable television or telephone service providers or the like, on customer premises. Those skilled in the art will appreciate that the embodiments described herein are applicable to any "provider" that delivers content to a STB, or similar device.

In addition to the embedded operating code and the Bootloader code, service providers may also load other software on the IP STB to, for example, interact with a headend of the service provider, among other things. This additional software may be the service provider's own code, or more frequently, code generated by a third party. If the STBs are already in the field, the additional software may be delivered to the STBs using a broadcast technique. Notably, in allowing third party software to be loaded on STBs, there is the potential that corrupted, or worse, malicious software may be proliferated.

To ensure that only authorized software is loaded and executed on the STB, a software code image authentication mechanism may be implemented using a public-private key pair scheme along with digital certificates. Initially, in a preferred implementation, a root chain-of-trust on the set top box is established by a hardware-enforced mechanism that begins by authenticating the Bootloader itself before any other code execution is permitted.

Figure 1:
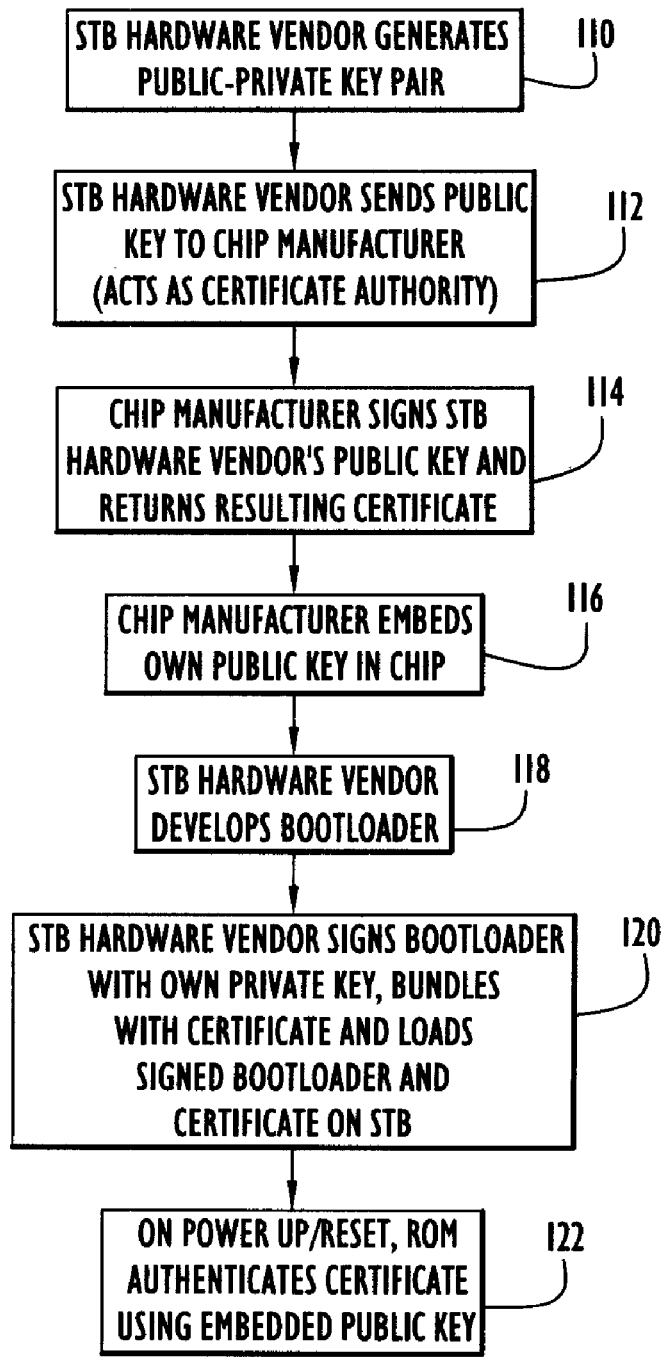
FIG. 1 depicts a hardware-enforced authentication mechanism in accordance with embodiments of the present invention.

FIG. 1 illustrates a series of steps for implementing the hardware-enforced authentication mechanism. At step 110, a STB hardware vendor generates a public-private key pair, referred to as the "Bootloader Signing Key," and then at step 112, sends the public key portion thereof to, e.g., a chip manufacturer whose chips are to be incorporated in the STB asset. As those skilled in the art will appreciate, the chip manufacturer may then function as a "certificate authority" whereby, at step 114, the chip manufacturer signs the public key portion with its own chip manufacturer private key and returns a resulting digital certificate to the STB hardware vendor.

At step 116, in the course of manufacturing the integrated circuit (i.e., chip) for the STB, the manufacturer embeds its own public key in the circuit hardware. Meanwhile, at step 118, the STB hardware vendor develops the Bootloader code and at step 120 signs the code with its own private key, and then bundles the signed Bootloader code with the digital certificate previously received from the chip manufacturer, and loads these components in the flash memory or RAM of the STB. At step 122, when the STB thereafter powers up or is reset, the chip manufacturer's public key that is embedded in the chip is used to authenticate the digital certificate that is bundled with the Bootloader code, thereby authenticating the public key portion of the Bootloader signing key. The Bootloader code can then be properly authenticated with that public key. The procedure described above establishes a first link in a chain-of-trust, where the first link is considered to be a hardware-based authentication link.

Stated alternatively, if the Bootloader is executing on the STB, then the hardware-enforced security mechanism must have "passed" and the Bootloader is thereafter "trusted." As will be explained in more detail below, a further chain-of-trust thereafter flows from this first hardware-enforced authentication mechanism to different keys, certificates and code.

Figure 2:
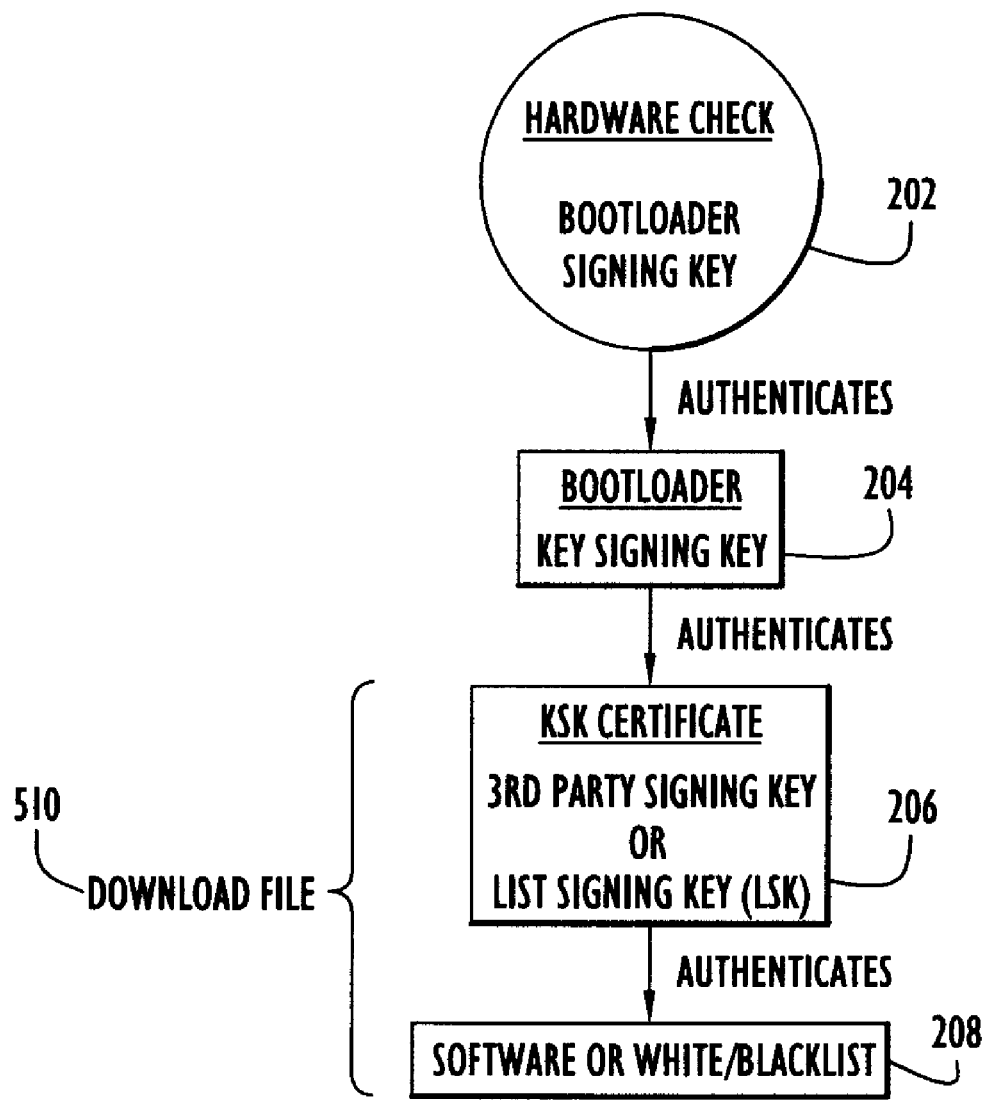
FIGS. 2 and 3 illustrate how a chain of trust is established in accordance with embodiments of the present invention.

FIG. 2 depicts a series of steps that illustrate a chain of trust for authenticating different software components, lists and keys that are intended to be run or used on the STB. Step 202 represents the hardware enforced authentication that is based on the STB hardware vendor's Bootloader Signing Key and that was described with respect to FIG. 1. The chain-of-trust may then be extended to other authorities through a series of key signing processes. In an embodiment, and as depicted by step 204, the STB hardware vendor itself may act as a certificate authority by signing a third Party Signing Key (i.e., signing a third party's public key) using a Key Signing Key ("KSK") and returning a digital certificate, referred to as a "Key Signing Key Certificate" or "KSK Certificate," to an authorized third party. In accordance with an embodiment, each such KSK Certificate includes an embedded serial number that is associated with the third party. As will be explained more fully below, the KSK may also be used to sign a List Signing Key (LSK) that itself is used to authenticate a list of serial numbers.

An authorized third party may then sign its own software code (or image) using its own Third Party Signing Key and embed the KSK Certificate in the resulting software image, as shown by step 206. At run-time, as represented by step 208, the Bootloader extends trust to the software image by first authenticating the embedded KSK Certificate, and then using the public key from the certificate to authenticate the software image itself. The Bootloader may also, in a similar fashion, authenticate a whitelist or blacklist. Details of such a process are described later herein.

FIGS. 3-7 depict in more detail the several signing and authentication processes, and practical effects thereof, in accordance with embodiments of the invention.

Figure 3:
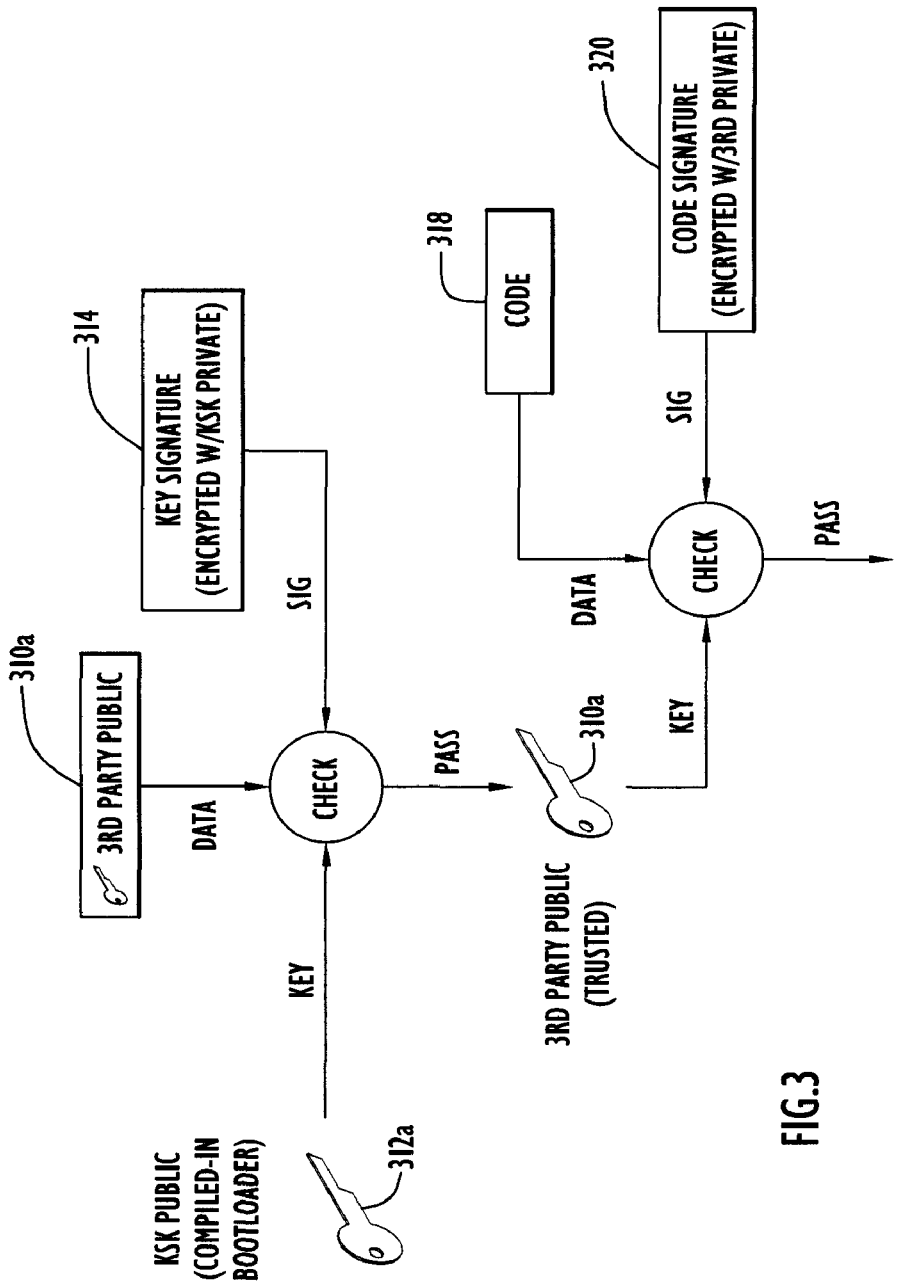

As shown in FIG. 3, a KSK public key 312a is compiled as part of the Bootloader and is used to establish the authenticity of the third party public key 310a, which is treated as data at this point. If the key signature 314 (which has been encrypted with a KSK private key 312b) passes, then the third party public key can be trusted as authentic (since it was signed by the private KSK). The third party public key 310a and KSK Signature 314 are elements of the KSK Certificate 404 (described below).

The third party now-"trusted" public key 310a is then used to establish the authenticity of a code image 318. If a code signature 320 (which has been encrypted using the third party's private key 310b) passes, then trust can be extended to the code image 318 (since it was signed by the third party private key, whose public key portion has been authenticated).

Key Signing Process

Figure 4:
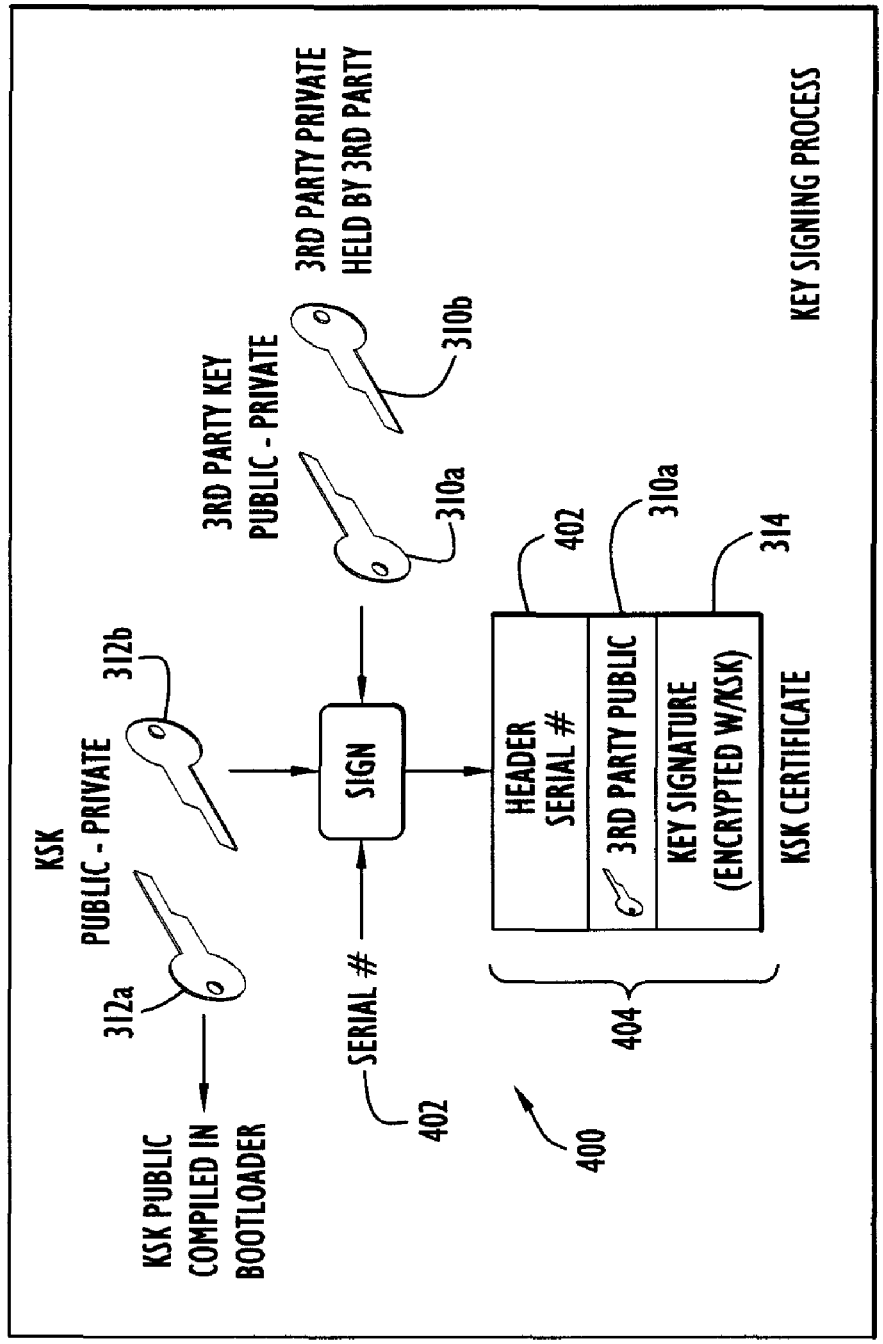
FIG. 4 illustrates a key signing process in accordance with embodiments of the present invention.

As shown by FIG. 4, a key signing process 400 is employed to sign the third party public key 310a (its private key 312b being held in confidence) and a serial number 402 using the KSK private key 312b (recalling that the KSK public key 312a is compiled in the Bootloader). The resulting output file is a "KSK Certificate" 404, which includes a copy of the third party public key 310a, the serial number 402, and a signature of the data 314. Those skilled in the art will appreciate that there may be additional header fields associated with KSK Certificate 404 to ensure file corruption can be detected before any "bad" data is used.

The KSK Certificate 404 is provided to the third party and is used in subsequent code-signing steps, as explained below. The KSK Certificate need not be kept secret.

Code Signing Process

Figure 5:
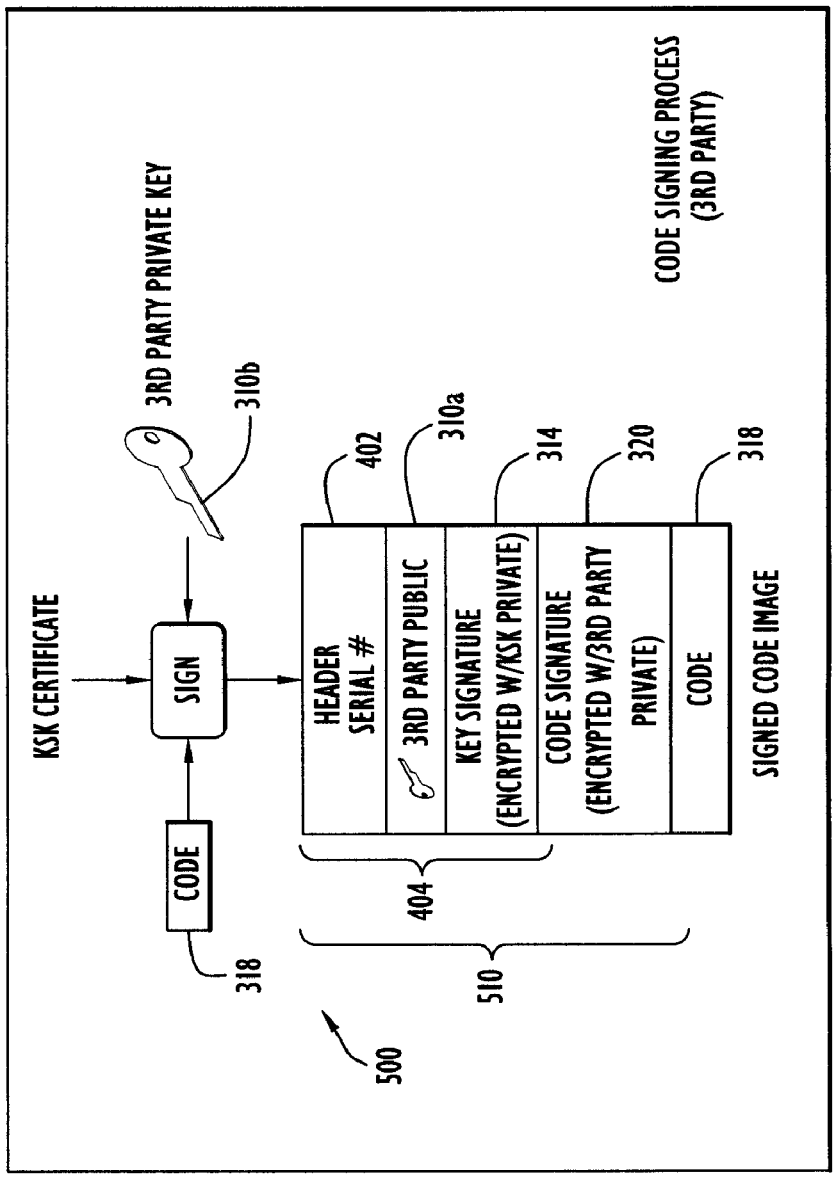
FIG. 5 illustrates a code signing process in accordance with embodiments of the present invention.

When a third party has been given a serial number-controlled KSK Certificate 404, the third party then has the ability to sign its own code images, as shown by the process 500 depicted in FIG. 5. Specifically, software code (or simply "code") 318 is signed by the third party's private key 310b and the data from the KSK Certificate 404 is copied into the output image file 510. The third party private key 310b is used to generate a signature 320 for the code block. The code 318, KSK Certificate data 404, and code signature 320 are all packaged into a single image file 510 along with additional header bytes (not shown) that can be used to detect file corruption that can occur in transport. This signed code image file 510 can then be provided to a Download Server for broadcasting and loading into, e.g., flash memory on STBs.

Code Validation Process

Figure 6:
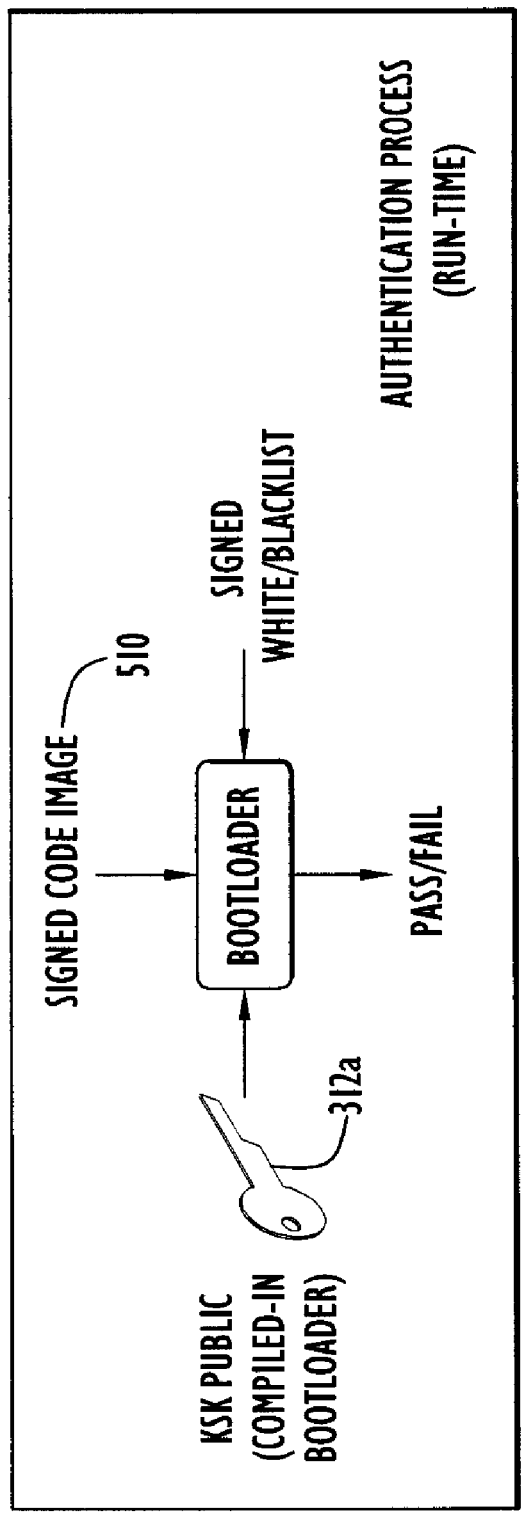
FIG. 6 illustrates an authentication process in accordance with embodiments of the present invention.

As shown in FIG. 6, the Bootloader authenticates the signed code image file 510 immediately after download, before committing it to memory, or allowing it to execute on the STB, or combinations thereof. More specifically, the Bootloader uses the code header data along with the public key of the KSK, compiled-in the Bootloader, to authenticate the code image. This process was described in connection with FIG. 3.

As will be explained in more detail below, an optional blacklist/whitelist listing unique serial numbers of KSK Certificates can be used to reject authority for any particular serial number that is associated with a KSK Certificate, thereby rejecting the authority of a given third party vendor to have its code loaded on the STB.

List Signing Process

Figure 7:
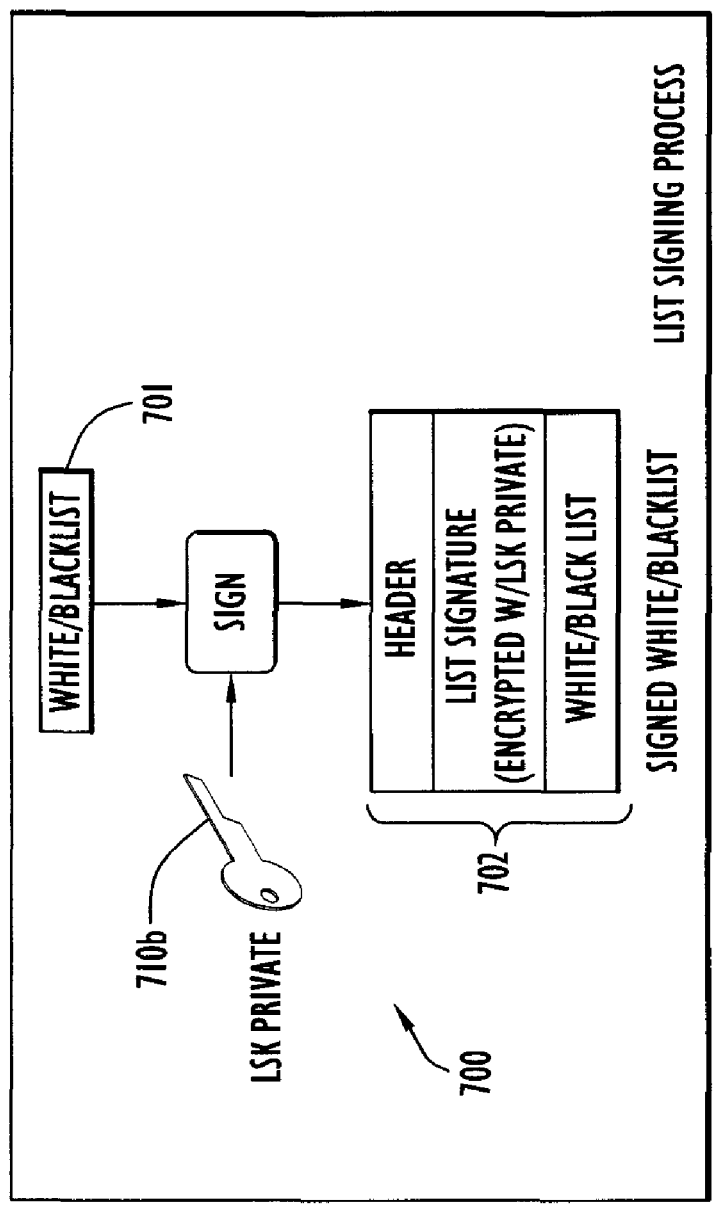
FIG. 7 illustrates a list signing process in accordance with embodiments of the present invention.

FIG. 7 shows how signing authority can be revoked/blacklisted (or expressly given/whitelisted) using a whitelist/blacklist mechanism. As shown, a list of serial numbers (previously assigned to respective third party vendors) in a whitelist or blacklist 701 is signed by process 700 using a private key portion 710b of a List Signing Key ("LSK"), resulting in a signed whitelist/blacklist 702 that is then downloaded and stored in the memory of the STB for reference by the Bootloader. FIG. 2 shows how the LSK is used to authenticate a whitelist/blacklist.

Referring back to FIG. 6, when signed code image file 510 is received at the STB, the Bootloader not only authenticates the code image, but also may consult the signed whitelist/blacklist 702 to determine if a serial number on that list corresponds to the serial number 402 of the code image 510. If the serial number is listed in a whitelist, then the Bootloader will allow the code to be installed and/or executed, otherwise it may be rejected. If the serial number is listed on a blacklist, then the Bootloader will reject the code image 510, otherwise it may be accepted.

Whitelist/Blacklist Management

The whitelist or blacklist 701 comprising serial numbers that can be used to revoke signing authority to particular third party keys must be available to the Bootloader at the time a given code image is authenticated. Consequently, the list may be compiled-in the Bootloader or downloaded any time before code is downloaded. A compiled-in list is secure in that it cannot be tampered with because it is part of the hardware enforced authentication mechanism.

If the list is downloaded, the LSK private key used for signing the list ensures the content is not altered. On the other hand, the download mechanism or flash memory storage table could possibly be interfered with. For example, if the list were prevented from being loaded at all into flash memory, then the Bootloader would not know to reject a given serial number that was listed on the list that was blocked. Thus, a downloaded blacklist is a "best effort" method of authority revocation. A compiled-in list may be considered more secure.

Another approach, but still possibly vulnerable, is to require all serial numbers to be whitelisted. Thus, if the external list is removed or tampered with then authority can only be lost and not gained. However, if authority were granted to a given serial number in one version of the file and later revoked in a later version of the file, authority could be restored by re-flashing the original list back into flash memory.

List Control

In an example implementation, the STB recognizes a whitelist on a STB Download server associated with the headend of the system provider. As explained above, upon download this list is authenticated using the same third party trust mechanism that is used to authenticate software images. In accordance with a particular embodiment of the invention, after a whitelist is loaded into the STB, a new list only from the same signing authority (serial number) can replace the earlier-downloaded list. As mentioned earlier, the initial whitelist that is loaded into a STB can be put in place explicitly before STB delivery, or may be loaded on first-boot in the host network. In one possible implementation, when an STB boots without any whitelist in place, then any STB-authorized Third Party Certificate may be accepted. However, once a whitelist has been received and stored, only the third party key serial number for the LSK used to sign the stored list will be recognized for list replacement.

White List Removal

A List Maintenance Code Signing Key ("LMCSK") may always be authorized even if not included in the whitelist. More specifically, a utility may be provided to account for when it is necessary to remove the whitelist in, for example, a customer repair facility in order to allow diagnostic software to be loaded or to allow for repaired STBs to be redeployed in a new network. For example, a "Whitelist Delete Application" may be created and signed by the LMCSK. Once the application is executing, it may contact a secure server on a local network to identify the STB and receive permission to remove the whitelist. The messages exchanged ensure mutual authentication and generate a delete request for that single STB. In a preferred implementation, only authorized repair centers will have such a secure server. Alternatively, the server may be operated by a third party, e.g., the STB hardware vendor, and the authentication may be performed over a network. The LMCSK is the same as a 3d party Code Signing Key except that it has a special or unique serial number recognized by the Bootloader.

On occasion, it may also be desirable to remove the whitelist of a large population of STBs in the field to facilitate the authorized acquisition of assets containing conflicting whitelists or to recover from a lost LSK. For example, one service provider may legitimately acquire the customers and assets of another service provider and thus acquire all of the STBs of the other service provider.

In this scenario, a "WhiteList Delete Message" may be signed by the List Removal Key ("LRMK") and be placed on the STB Download Server. The message preferably contains the list of the LSK serial numbers targeted for removal. For security purposes, after the use of such a WhiteList Delete Message the targeted LSK Keys mentioned in the message should no longer be used. The LRMK is the same as a LSK except that it has a special or unique serial number recognized by the Bootloader.

To summarize, when no whitelist or blacklist is loaded in an STB, any authentic third party certificate can be used to download Software or whitelists/blacklists. When either list is already loaded in an STB, it is preferable that only the third party certificate that signed the saved list can be used to replace it. Further, in accordance with a preferred embodiment, only third party certificate serial numbers listed in the whitelist/blacklist may be accepted for authentication.

There is also a scenario where a repair facility may obtain STBs from several different system operators, where the STBs would have different whitelists/blacklists stored. It may be desirable for the repair facility to restore the STBs back to their "factory-fresh" state (i.e. no whitelist/blacklist at all). However, it would be unlikely that all operators could be convinced to white-list the serial number of the repair software (and, in fact, from a security perspective, it would be prudent if they excluded it). Further, if the STB hardware vendor had a master-key to remove the lists (or any software for that matter), that would represent a security vulnerability. To address these issues, embodiments of the present invention provide the following method to remove whitelists/blacklists at a repair facility.

In accordance with an embodiment, the list-removal software application, before it will actually remove the list, communicates with a PC-based "Authentication Server" to get permission. The Authentication Server can be located anywhere physically, e.g., at the repair facility or at a central location.

The server itself may include complex rules regarding which serial numbers are permitted. An audit trail of the server's activities is preferably kept. The server also preferably has a private-key token card of some sort that can be used to encrypt or sign data. The practical effect of the token is that "private key" encryption allows a client (i.e., the STB in this case) to authenticate that the server it is talking to has a valid private key by using the compiled-in public key to authenticate it. Private keys are presumed to be tightly controlled, never exposed, and mathematically impractical to reverse-engineer. Accordingly, if there is evidence that an entity correctly performed an encryption using the private key, that entity can be trusted.

The removal software application running in the STB may generate a random block of data, send it to the authentication server along with serial number information and challenge it to return a valid response. The Authentication server then uses the private key to encrypt (or sign) the random data and send it back to the STB software. The STB software uses the public key to decrypt (or signature check) the response to confirm that whomever it is talking to does indeed have the private key. The random data prevents a "record-and-playback" attack—ensuring every exchange will be unique.

Once the STB software authenticates, it can communicate with the Authorization Server and, with permission, it will then execute the function to remove the list(s) from secure storage.

A goal of the sequence described above is to make sure that the list-removal software application in the STB that is signed with the LMCSK (always white-listed) becomes inert in the absence of the authentication server. In other words, if someone at a repair facility were to steal the software signed with the LMCSK, it would be of no use without the Authentication Server. The Authentication server is preferably secured in a locked room and may be local or at an offsite location.

In one implementation, a STB hardware vendor-Signed Delete Message may be used to remove a specific whitelist, and a STB hardware vendor-Signed Delete Application may be used to remove individual whitelists in a repair facility with a secure server.

The systems and methods described herein may be embodied in other specific forms without departing from the spirit or essential characteristics thereof. The foregoing embodiments are therefore to be considered in all respects illustrative and not meant to be limiting.

What is claimed is:

1. A method for maintaining control over a set-top-box (STB) asset, comprising:
   authenticating, using a hardware-based authentication process, a first software application, the first software application having been generated by a first party, wherein the STB asset is operated by a second party;
   once authenticated, using the first software application to authenticate a public key received with a second software application that was generated by a third party and is intended to be run on the STB asset;
   once authenticated, using the public key of the third party to authenticate the second software application generated by the third party; and
   confirming that the second software application is authorized to be run on the STB asset by consulting a list of authorized third parties, wherein consulting the list of authorized third parties comprise utilizing a list maintenance code signing key (LMCSK) having a unique serial number always recognized by the hardware-based authentication process, and locating the third party that generated the second software application, wherein the list of authorized third parties is itself authenticated by the first software application using the LMCSK.

2. The method of claim 1, wherein the list comprises a plurality of serial numbers associated with the third parties.

3. The method of claim 1, further comprising restricting the ability to replace the list.

4. The method of claim 3, further comprising allowing replacement of the list only by a same signing authority that signed the list.

5. The method of claim 1, wherein said hardware-based authentication comprises authenticating a digital certificate using a public key embedded in hardware.

6. The method of claim 1, wherein the list is compiled in the STB asset.

7. The method of claim 1, wherein the list is downloaded from a server.

8. The method of claim 1, wherein the list is digitally signed with a private key belonging to the second party.

9. The method of claim 8, further comprising authenticating the digitally signed list using a public key compiled in the first software application.

10. The method of claim 8, wherein the first party is the asset hardware vendor.

11. The method of claim 8, wherein the second party is a content service provider.

12. The method of claim 11, wherein the second party is an IPTV service provider.

13. A method, comprising:
    storing a first digitally signed list on an electronic device, the first digitally signed list including identification data for a plurality of software vendors authorized to load and run software on the electronic device;
    receiving, at the electronic device, a second digitally signed list, the second digitally signed list also including identification data for a plurality of software vendors authorized to load and run software on the electronic device, wherein the identification data comprises a list maintenance code signing key (LMCSK) having a serial number unique to the signing authority that is always recognized by a bootloader;
    determining that a signing authority that signed the second digitally signed list is the same as a signing authority that signed the first digitally signed list, wherein determining that the signing authority that signed the second digitally signed list is the same as the signing authority that signed the first digitally signed list comprises authorizing the LMCSK; and
    replacing, utilizing the bootloader, the first digitally signed list with the second digitally signed list when it is determined that a signing authority that signed the second digitally signed list is the same as a signing authority that signed the first digitally signed list.

14. The method of claim 13, wherein the electronic device comprises a set top box.

15. The method of claim 13, wherein the first and second digitally signed lists are whitelists.

16. The method of claim 13, wherein said replacing is performed, at least in part, by a software program that has been authenticated via the bootloader.

17. A method comprising:
    receiving at a set top box a signed list of serial numbers, wherein the serial numbers respectively identify authorized digital certificates, and a digital certificate includes a public key associated with a developer of a code image;
    storing the list of serial numbers in a memory of the set top box;
    receiving at the set top box a signed replacement list of serial numbers and a list maintenance code signing key (LMCSK) having a serial number unique to the signing authority that is always recognized by a bootloader;
    determining if a signing authority that signed the signed replacement list of serial numbers is the same as a signing authority that signed the list of serial numbers; and replacing, utilizing the bootloader, the list of serial numbers with the list of serial numbers from the signed replacement list of serial numbers when the signing authority that signed the signed replacement list of serial numbers is the same as a signing authority that signed the list of serial numbers.

18. The method of claim 17, wherein the same signing authority is a system operator for the set top box.

19. The method of claim 17, wherein said replacing is performed, at least in part, by a software program that has been authenticated via a hardware-enforced authentication mechanism.

20. A set-top-box (STB), comprising:
a public key embedded in a hardware device in the STB; and
software code stored and operable on the STB to authenticate, based at least in part on the public key embedded in the hardware device and a stored list of authorized software vendors and a list maintenance code signing key (LMCSK) having a serial number unique to the signing authority that is always recognized by the hardware device, a software image downloaded from a server and prepared by one of a plurality of software vendors, the software code further operable to replace the stored list of authorized software vendors only when a new list of authorized software vendors is signed by a same signing authority that signed the stored list of authorized software vendors and recognized by the LMCSK.

21. The set-top-box of claim 20, wherein the set-top-box communicates over an internet protocol (IP) network.

22. The set-top-box of claim 20, wherein the set-top-box is operable with an internet protocol (IP) television (IPTV) system.

23. The set-top-box of claim 20, wherein the software code is operable to receive the new list of authorized software vendors from a download server.

* * * * *